United States Patent [19]
Vollmer

[11] Patent Number: 4,739,793
[45] Date of Patent: Apr. 26, 1988

[54] THERMOSTATICALLY OPERATED VALVE

[75] Inventor: Rudolph Vollmer, Mosbach, Fed. Rep. of Germany

[73] Assignee: Honeywell-Braukmann GmbH, Fed. Rep. of Germany

[21] Appl. No.: 937,659

[22] Filed: Dec. 4, 1986

[30] Foreign Application Priority Data

Dec. 7, 1985 [DE] Fed. Rep. of Germany ....... 3543330

[51] Int. Cl.⁴ .............................................. F16K 1/34
[52] U.S. Cl. ............................. 137/599.1; 137/614.14; 236/42
[58] Field of Search ...................... 137/614.14, 614.21, 137/599.1, 625.33, 454.5, 329.1, 329.2, 625.33; 251/11, 298; 236/92, DIG. 2

[56] References Cited

U.S. PATENT DOCUMENTS

| | | | |
|---|---|---|---|
| 3,838,812 | 10/1974 | Johnson | 236/42 X |
| 4,215,714 | 8/1980 | Lave | 137/454.5 X |
| 4,558,819 | 12/1985 | McDonald | 236/42 |
| 4,611,629 | 9/1986 | Seiffert | 137/614.14 X |

Primary Examiner—A. Michael Chambers
Assistant Examiner—John C. Fox
Attorney, Agent, or Firm—Mitchell J. Halista; Albin Medved

[57] ABSTRACT

A thermostatically operated valve uses a valve insert screwed into a tube-shaped stud at a valve housing. The valve insert comprises two spaced-apart valve seats which are located on opposite walls of a chamber provided within the valve insert series-connected in a flow direction with one seat forming a control valve seat and the other seat forming a shut-off valve seat. Between the valve seats, a valve closing body is arranged within the chamber for temperature control operation by a thermostat device. The outlet of the valve is connected to a chamber downstream of the shut-off valve seat and a throttling bore connects the chamber between both valve seats with the outlet of the valve. A removal of the thermostat device allows the valve closing body to be urged against the shut-off valve seat by a spring within the valve insert while maintaining a flow through the throttling bore.

8 Claims, 3 Drawing Sheets

THERMOSTATICALLY OPERATED VALVE

BACKGROUND OF THE INVENTION

1. Field of the Invention

The present invention relates to a thermostatically operated valve.

2. Description of the Prior Art

Thermostatic valves are generally well known, e.g., as shown in German Pat. No. 3 112 138. That valve comprises a valve closing body cooperating with a single valve seat and being contoured in such a way that after progressively opening the valve the passage of fluid is reduced or limited, respectively. Therefore, at an undesired removal of the thermostat setting knob, the fluid passage is reduced or limited, respectively, in a desired manner. The known valve represents a special design, and the device provided there cannot be used for retrofitting of already installed valves. Moreover, the known design is not capable of fully throttling the throughput of a heating fluid since the closing body has to be assembled through the valve seat with clearance. Furthermore, small tolerances are required in order to limit leakage.

SUMMARY OF THE INVENTION

It is an object of the present invention to devise a simply designed thermostatically operated valve which after removal of the thermostat setting knob is either totally throttling the fluid throughput or is throttling the fluid throughput down to a small residual quantity, respectively.

It is another object of the present invention that a double seat arrangement is provided within a replaceable valve insert so that already installed valves of conventional design can be retrofitted with the device according to the present invention.

In accomplishing these and other objects, there has been provided, in accordance with the present invention, a thermostatically operated valve comprising a valve seat body, and a valve closing body being actuated by a thermostat know via a valve stem and interacting with the valve seat body, the valve seat body including two valve seats being series connected in a flow direction and that the valve closing body is arranged between both of the valve seats.

DESCRIPTION OF THE PREFERRED EMBODIMENT

Figure 1:
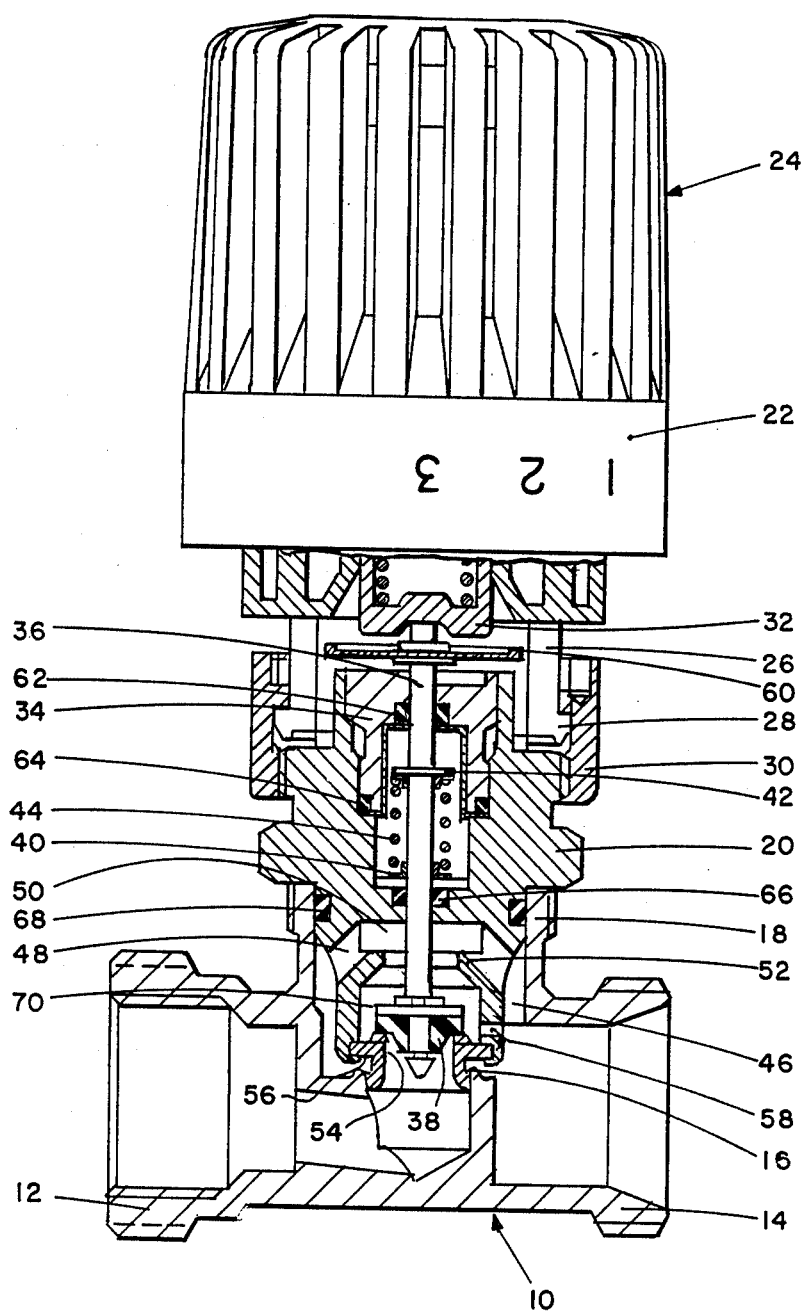
FIG. 1 shows a cross-sectional illustration of a thermostat valve according to the present invention in its closing position.

Referring to FIG. 1, there is shown a conventional valve housing 10 having an inlet 12 and an outlet 14. Between the inlet 12 and the outlet 14, a valve seat 16 is provided within the valve housing 10. A valve insert 20 is screwed into a tube-shaped housing stud 18 extending upwards. A conventional thermostat setting knob 24 comprising a control grip surface 22 includes downwardly extending webs 26 which are flexible in radial direction and are provided with end noses 28 which are engaged by a union nut 30. The union nut 30 is screwed on a portion of the valve insert 20 extending from the housing stud 18, whereat the webs 26 are abutting on a head face of the valve insert. Herewith a spring-biased pusher 32 being actuated by a thermostat element (not shown) abuts against a valve stem 36 which is guided in the valve insert 20 and in a rod packing 34. A valve closing body 38 is provided at the lower end of the valve stem 36.

The rod packing 34 is screwed from the other side into a central chamber within the valve insert 20. A biasing spring 40 for the valve stem 36 abuts on one hand against at snap ring 42 and on the other hand against the bottom of a central recess 44 within the valve insert 20. The snap ring 42 is seated in a peripheral groove on the valve stem 36.

The lower portion of the valve insert 20 has a reduced outer diameter so that a ring-shaped chamber 46 is formed between this portion and the inner wall of the housing stud 18 with the chamber 46 being in fluid connection with the outlet 14. This ring-shaped chamber 46 is connected to a chamber 50 downstream of a shut-off valve seat 52 by means of discharge borings 48, whereat the shut-off valve seat 52 is inwardly extended to face the valve insert 20. A control valve seat 54 is connected to the lower portion of the valve insert 20 by means of a jointed-flange connection, whereat the control valve seat 54 is inserted into the valve seat 16 at the valve housing 10 and is tightened by means of a sealing lip 56. The valve closing body 38 is arranged between the shut-off valve seat 52 and the control valve seat 54, asnd it is movable within a chamber 70 which is connected by a throttling bore 58 to the outlet 14.

Figure 2:
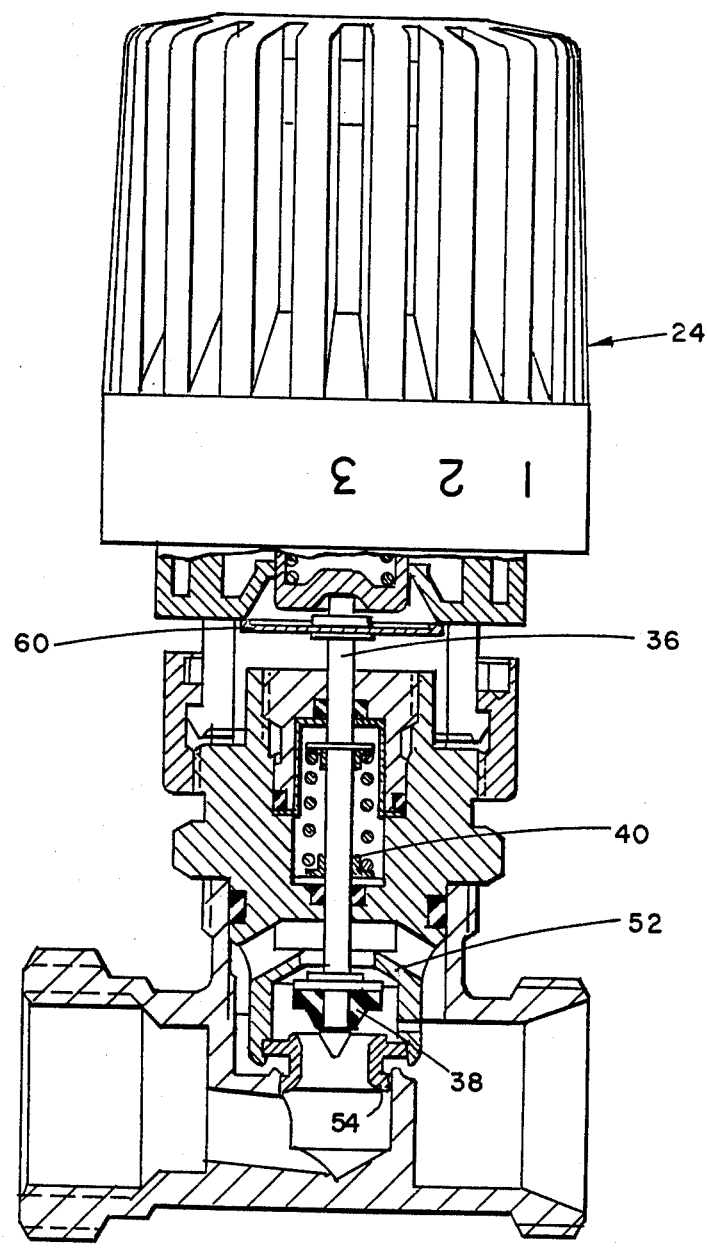
FIG. 2 shows the thermostat valve of FIG. 1 in its fully opened position.

At the portion of the valve stem 36 which extends from the rod packing 34, a boss plate 60 is secured by means of two snap rings with the boss plate 60 abutting against the thermostat setting knob 24 as shown in FIG. 2 in the event where the valve is fully opened. Thereby the valve stroke is limited in such a way that the flow area at the shut-off valve seat 52 equals the flow area at the control valve seat at a nominal throughput or is greater than the flow area at the control valve seat at the nominal throughput, respectively. Several O-ring seals 62, 64, 66 and 68 serve to seal between the valve stem 36 and the rod packing 34, between the rod packing 34 and the valve insert 20, between the valve stem 36 and the valve insert 20 and between the valve insert 20 and the housing stud 18.

Figure 3:
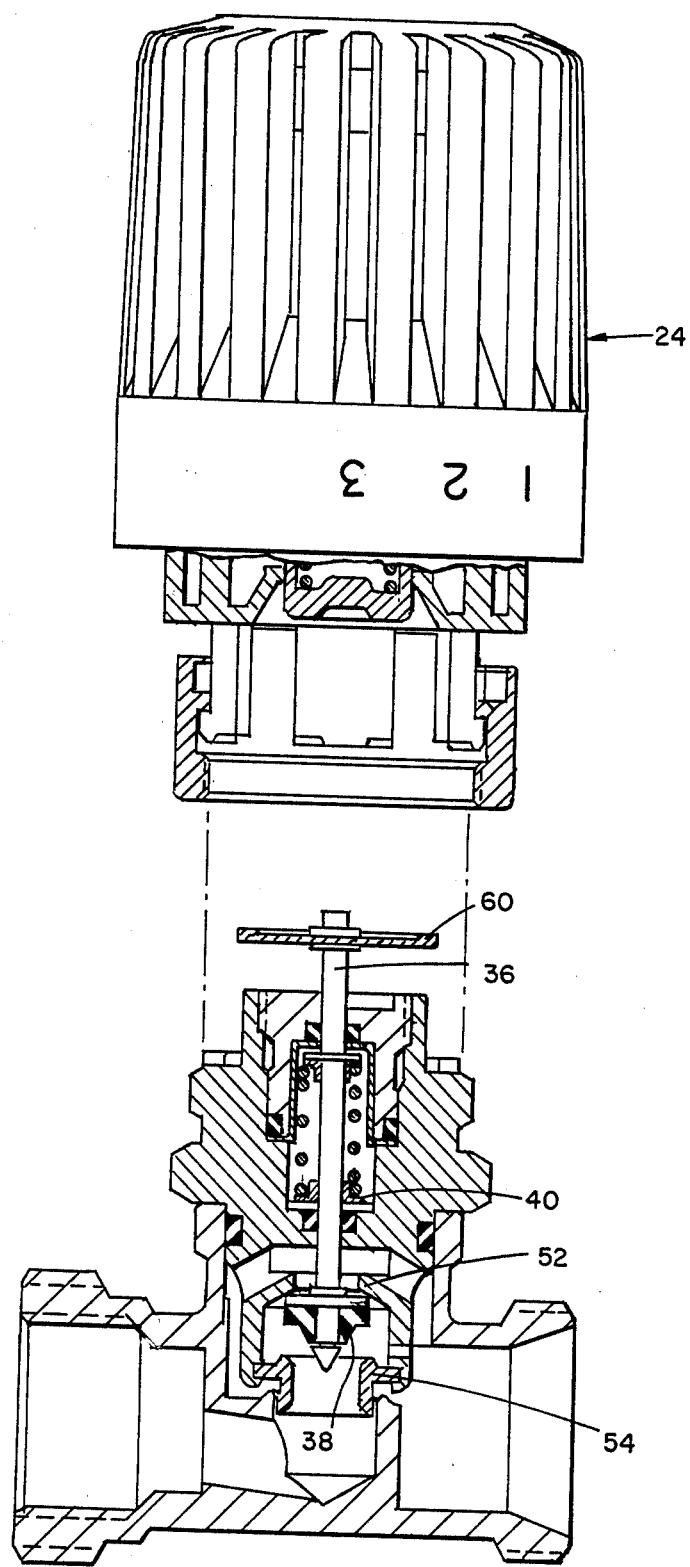
FIG. 3 shows the thermostat valve of FIG. 1 with the thermostat setting knob removed.

As shown in FIG. 1, in the closing position of the thermostat valve the closing body 38 abuts the control valve seat 54. On the other hand, according to FIG. 2, the valve takes a fully opened position which is given by the contact of the boss plate 60 with the thermostat setting knob 24 so that the maximum nominal throughput is predetermined. According to FIG. 3, the thermostat setting knob 24 has been removed so that the biasing spring 40 shifts the valve closing body 38 to be in abutment with the shut-off valve seat 52 so that only the throttling bore 58 is responsible for the heating fluid throughput which prevents freezing of a downstream radiator.

Accordingly, it may be seen that there has been provided, in accordance with the present invention, an improved thermostatic valve.

The embodiments of the present invention in which an exclusive property or privilege is claimed are defined as follows:

1. A thermostatically operated valve comprising a thermostatically controlled actuator, a valve seat body having an internal chamber and a pair of spaced-apart valve seats located on respective walls of said chamber, and a valve closing body within said chamber and actuated by said thermostat actuator via a valve stem and interacting with said valve seats, said valve seats being in series in a flow direction between an inlet and outlet and said valve closing body being arranged between said valve seats in said chamber and including a throttling bore connecting the valve outlet and the chamber between said valve seats.

2. A valve according to claim 1, wherein said valve seat first passed through by a flow forms a control valve seat and that the valve seat subsequently passed through by a flow forms a shut-off valve seat.

3. A valve according to claim 1 wherein both valve seats are each arranged as a replaceable valve insert.

4. A valve according to claim 3, wherein said valve insert is screwed into a housing stud of said valve seat body.

5. A valve according to claim 4, wherein said valve control seat is tightly connected to the intrinsic valve seat of a conventional valve housing.

6. A valve according to claim 5, wherein said control valve seat is mechanically interlocked into the lower part of the valve insert.

7. A valve according to claim 6, wherein a lower part of the valve insert comprises a reduced outer diameter with respect to the upper part in order to provide a ring-shaped chamber in fluid connection with the valve outlet with said chamber being connected via discharge borings downstream of the shut-off valve seat.

8. A valve according to claim 7, wherein a boss plate is connected to the valve stem to limit a stroke of said valve stem by abutting against the thermostatic actuator at a fully opened state of the valve.

* * * * *